May 24, 1938.  C. K. LAWRENCE ET AL  2,118,439
PROCESS FOR THE PREPARATION OF FERTILIZERS
Filed July 20, 1937
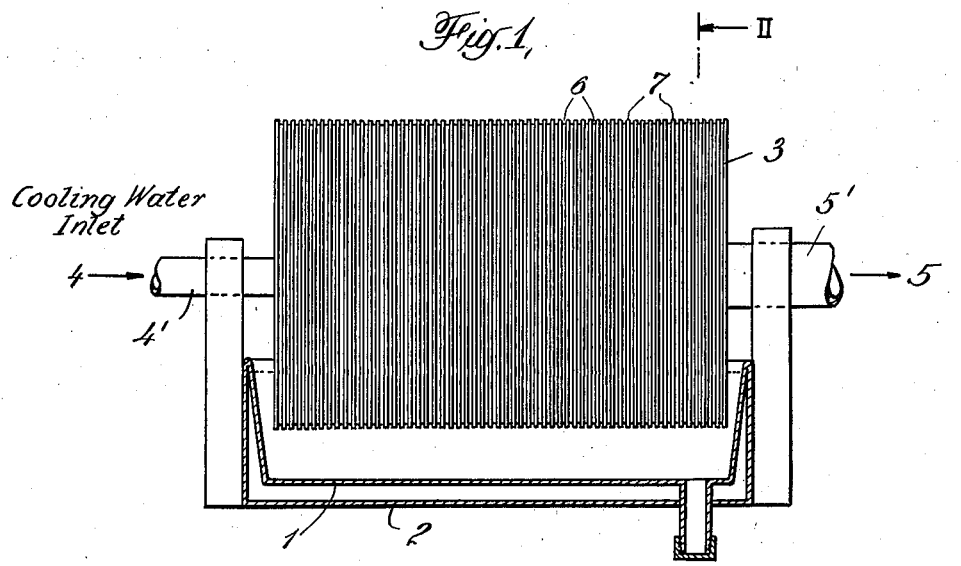
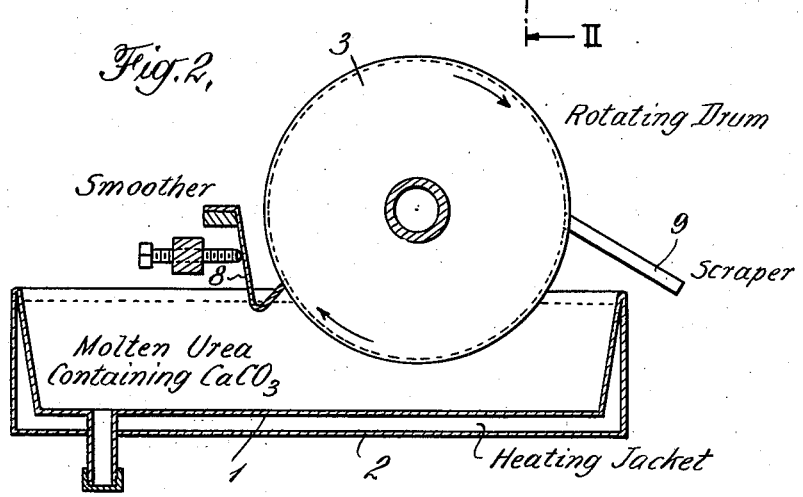
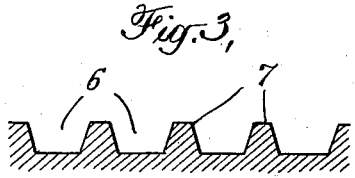
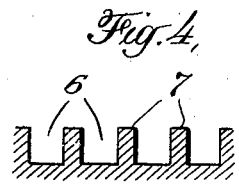
INVENTORS
Charles K. Lawrence
Aylmer H. Maude
BY
ATTORNEY Patented May 24, 1938

2,118,439

UNITED STATES PATENT OFFICE 2,118,439

PROCESS FOR THE PREPARATION OF FERTILIZERS

Charles K. Lawrence, Baldwinsville, and Aylmer H. Maude, Niagara Falls, N. Y., assignors to The Solvay Process Company, New York, N. Y., a corporation of New York Application July 20, 1937, Serial No. 154,578

5 Claims. (Cl. 71—28)

This invention relates to a process and apparatus for the preparation of granular non-caking fertilizers from urea and a finely divided, inert, solid material.

Numerous processes have heretofore been proposed for preparing fertilizers in granular form from melts or from solid crystalline substances such as urea. For example, it has been proposed to fuse urea and to disperse the fusion in the form of droplets into a cooling gas. The disadvantage of such a procedure is that it entails constructing large chambers in which the sprayed fluid may travel through the cooling gas for a sufficient length of time to become solidified before striking the bottom of the chamber. It also entails the difficulties attendant upon dispersing through spray devices a fused material which tends to solidify.

It is an object of this invention to provide a process and apparatus for the preparation of granular products comprising urea and finely divided inert solid materials such as calcium carbonate, ground limestone, magnesite, phosphate rock and the like, which products are in the form of granules having a substantially uniform desired size, obtained by solidifying a fluid mixture of the urea and added material. By preparing such products in accordance with the process of this invention, they consist of substantially uniform granules, and these products may be readily and relatively inexpensively obtained. The invention is particularly of value in the preparation of fertilizers, for which it is highly desirable that the material be of granular form, relatively free from dust, and have little tendency to cake together during storage.

In carrying out the process of this invention a melt of urea containing water mixed with a finely divided inert solid material having a melting point above the melting point of the urea is prepared. The melt should contain a high proportion of urea with respect to the quantity of water present. This melt is then partially solidified in grooves formed on a cooling surface such as that of a cooled rotating drum which dips into a fusion of urea containing the finely divided solid. As the drum is rotated it picks up on its surface a layer of the melt of urea and inert solid which is wiped down to the level of the top of the ridges separating the grooves and during the further travel of the drum the material within the grooves solidifies to the desired degree in the form of strands which are removed from the grooves by means of a scraper element. In being lifted by the scrapers the strands of solidified material continuously formed in the grooves may be broken into particles of desired length to form a granular material of substantially uniform particle size and free from fine particles. The solidification of the melt in the grooves of the cooling drum takes place to a sufficient extent so that the material during or after removal from the drum may be broken into particles which retain their shape and resist disintegration during subsequent handling.

In solidifying fused urea upon cooled surfaces on which the fused material is spread, the solid tenaciously adheres to the cooled surfaces. We have discovered, however, that by mixing a finely divided solid material with a melt of urea and by including in the mixture a small proportion of water, a fluid or plastic mass may be obtained by heating the mixture to moderate temperatures, and the heated material may be sufficiently solidified by cooling through a limited temperature range, e. g. through a temperature range of about 75° C. or less, to form a material sufficiently solid to be broken from the grooves and into particles of granular size and character which are sufficiently rugged to retain their shape and resist disintegration after removal from the grooves in which the material is solidified.

An apparatus which may be employed in carrying out the process of this invention, comprises a rotatable drum having upon its surface circumferential grooves separated by ridges. Both the width of the bottom of the grooves and the depth of the grooves are of the order of 0.1 inch. The sides of the grooves preferably flare outward from each other towards the top, forming an angle of about 99½° with the bottom of the groove. The grooves are preferably in the form of discrete circles in planes perpendicular to the axis of the drum, but may be in the form of one or more continuous helixes on the drum surface. Grooves may also be provided in the form of concentric circles at the ends of the drum over the area which is immersed in the melt as the drum rotates. The drum of the apparatus may be shortened to have but a very narrow cylindrical surface and all of the grooves then be formed on the end surfaces of the drum which dip into the melt. Provision is made for cooling the material in the grooves, as for example by employing a hollow metal drum through which a cooling medium is passed. Means are also provided for supplying a fluid or plastic material to the grooves of the drum, and for lifting solidified material from the grooves during rotation of the drum.

The accompanying drawing illustrates one example of such an apparatus. In the drawing Fig. 1 is an elevation, partly in cross-section, of an apparatus suitable for granulating fertilizers in accordance with this invention; Fig. 2 is a cross-section of the apparatus shown in Fig. 1, taken along the line II—II; Fig. 3 is an enlarged showing of a section of the surface of drum 3 of Fig. 1; and Fig. 4 illustrates a modification of the surface of drum 3 shown in Fig. 1.

The following example is illustrative of processes for the preparation of fertilizers in accordance with this invention:

*Example I*—A granular urea-limestone mixture may be prepared as follows: A urea-water solution obtained by heating ammonium carbamate under pressure, is evaporated until it contains 95% urea and the urea melt thus prepared is mixed with ground limestone in the proportions of about 55 parts of limestone for every 45 parts of urea. The urea and limestone are mixed at a temperature of about 115° C. and the mixture is introduced into the pan of the flaking device illustrated in the accompanying drawing.

The flaking device shown in Figs. 1 and 2 consists of a pan 1 having a jacket 2 whereby the above mixture of urea-limestone may be maintained at about 115° C. A metal drum 3 dips below the surface of the fusion in pan 1. Drum 3 is hollow and is provided with an inlet 4 and an outlet 5 formed in the hollow shafts 4' and 5' to which drum 3 is fixed for rotation with the shafts. The surface of drum 3 is formed of a series of grooves 6 separated by partitions 7. These grooves and partitions may take the form shown either in Fig. 3 or 4, the grooves of Fig. 3 being tapered toward the bottom while the grooves in Fig. 4 have parallel sides. The grooves 6 on the surface of drum 3 may have the following dimensions in inches:

|  | Fig. 3 | Fig. 4 |
| --- | --- | --- |
| Width (at top) | 0.12 | 0.07 |
| Width (at bottom) | 0.10 | 0.07 |
| Depth | 0.06 | 0.07 |
| Width (at top) of ridges between grooves | 0.03 | 0.03 |

Angle between sides and bottom 99.4°.

Above the surface of the melt in pan 1 on the side at which the surface of the drum emerges from the melt in its rotation, there is a smoother 8 which consists of a bar lying transversely across the face of drum 3 so that as the drum turns material on the drum surface lying above the partitions between the grooves is wiped off, leaving the strands or rods of material in the grooves clearly separated. The smoother 8 may be mounted so as to oscillate longitudinally and thus make any wear on its surface uniform. The apparatus also comprises a scraper 9 having teeth entering grooves 6.

In granulating the mixture of urea-limestone supplied to pan 1 a layer of fused urea-limestone mixture is picked up on the cooling surface of the drum from the pan and is cooled to about 50° C. at the point at which the scraper removes it from the grooves. Under these conditions and employing a flaking device with grooves having the above dimensions, the material is broken into granules of about 6 to 10 mesh size as it is lifted from the grooves on the drum by the scraper. Grooves of a larger size may be employed, but in such a case it is usually desirable to employ a breaker mechanism to prevent the material lifted from the grooves assuming the form of long strands. This breaker mechanism may consist of a rubber-covered, freely-turning roller, about ⅜" in diameter, positioned in the angle of the drum and the scraper. The use of such a breaker mechanism is also desirable when the material in the grooves is cooled to a lower temperature than that given above by the time it reaches the scraper. The granules are passed directly into a rotary drier and treated with heated air to dry them to a moisture content of about 0.1%. The granules, as removed from the flaker, are sufficiently solidified to be conveyed without coalescence to the rotary drier and to be dried substantially without disintegration or caking.

If desired, the granules produced in accordance with this process may be given a coating of the solid finely divided inert material. In thus proceeding the drying of the granulated material is controlled so as to leave about 0.4% moisture in the granules. The thus partially dried granules are then mixed with finely powdered limestone and the mixture tumbled in a drum at an elevated temperature to give the granules a coating of limestone.

The foregoing example is illustrative of the invention without defining its limits. The limestone used in carrying out the process of this invention is preferably magnesium limestone (dolomite). If it is desired to produce a product containing less magnesium than that imparted to the fertilizers by dolomite, a dolomitic limestone may be employed instead of dolomite.

In general, in granulating melts in accordance with the process described, the slurry or melt in the pan of the granulating device is maintained in a sufficiently fluid state so that it may be readily distributed on the cooling surface. In employing a rotating drum or other device such as a belt cooler in which a cooled surface passes into and then out of a melt of the material to be granulated, to pick up on the cooled surface a layer of the material, the material should be at a temperature at which it is partially congealed on the submerged portion of the drum or other cooling surface so that the material is retained thereon as it leaves the body of melt in the pan of the flaker. The material on the cooling surface by the time it reaches the point at which it is removed from the cooling surface is cooled to a temperature at which it has the proper plasticity for being lifted from the cooling surface and being broken into granules and yet is sufficiently solidified so that the granules will withstand the subsequent drying or coating treatment without coalescing or disintegrating. It is apparent, of course, that at no stage of the process should the materials be heated sufficiently to cause undue decomposition.

The preferred conditions employed in preparing granulated fertilizers by cooling a melt containing urea and limestone by distributing the melt on a cooled surface in accordance with the process of this invention, are in general as follows:

The mixtures may contain from 30% to substantially 100% urea, and preferably about 35% to 50% urea, the remainder being limestone (these percentages being calculated on a dry basis). The urea melt prior to mixing it with the infusible material may contain from 93% to 97% urea and 7% to 3% water, which corresponds to about 8 to 3 parts water for every 100 parts urea. Preferably the melt contains about 95% urea and 5% water. The temperature at which the melt is maintained in the pan of a flaker may be from about 100° C. to 125° C. The temperature to which the material is cooled on the drum of the flaker by the time it reaches the scraper may be from about 40° C. to 80° C. For mixtures of urea containing 3% to 8% water with limestone in amount sufficient to give a mixture containing 35% to 50% urea (dry basis), these are preferably maintained at about 115° C. in a flaker pan and cooled on the drum or other cooling surface to about 50° C. at the point of removal.

When in this specification and in the appended claims reference is had to an "infusible material", that term is not intended to be limited to an absolutely infusible material but to a material which is infusible with reference to urea; i. e., one which has a melting point above the melting point of the urea and remains as a solid when in admixture with fused urea.

We claim:

1. The process of preparing a granulated fertilizer which comprises preparing a fluid melt of urea, water and a substantial proportion of a finely divided solid material which is substantially infusible in the melt, the water being present in an amount within the range of about 3 to 8 parts of water for every 100 parts of total water and urea in the melt, distributing said fluid melt as strands or rods in grooves formed on a cooling surface, cooling the melt in the grooves to a temperature within the range of about 40° C. to about 80° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

2. The process of preparing a granulated fertilizer which comprises preparing a mixture of urea, water and finely divided limestone in the proportions of at least 30 parts of urea for every 100 parts of total urea and limestone and about 3 to 8 parts of water for every 100 parts of total water and urea in the mixture, distributing said mixture as a fluid melt at a temperature within the range of about 100° C. to about 125° C. as strands or rods in grooves formed on a cooling surface, cooling the melt in the grooves to a temperature within the range of about 40° C. to about 80° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

3. The process of preparing a granulated fertilizer which comprises preparing a fluid melt of urea, water and finely divided dolomite in the proportions of 35 to 50 parts of urea for every 100 parts of total urea and dolomite and about 3 to 8 parts of water for every 100 parts of total water and urea in the melt, distributing said fluid melt at about 115° C. as strands or rods in grooves formed on a cooling surface, cooling the melt in the grooves to a temperature of about 50° C., and breaking out of the grooves and into granules the strands or rods of melt which has been partially solidified by cooling it to said temperature.

4. The process of preparing a granulated fertilizer which comprises preparing a fluid melt of urea, water and a substantial proportion of a finely divided solid material which is substantially infusible in the melt, the water being present in an amount within the range of about 3 to 8 parts of water for every 100 parts of total water and urea in the melt, distributing said fluid melt as strands or rods in grooves formed on a cooling surface, said grooves having a width and a depth of the order of 0.1 inch, cooling the melt in the grooves to a temperature within the range of about 40° C. to about 80° C. which is so correlated with the water content of the melt that at the temperature to which it is cooled in the grooves the melt partially solidifies sufficiently for the strands or rods to be removed from the supporting surfaces of the grooves and to be broken into granules which retain the shape imparted thereto by the grooves, and breaking the thus solidified melt out of the grooves and into granules.

5. The process of preparing a granulated fertilizer which comprises preparing a fluid melt of urea, water and finely divided limestone in the proportions of 35 to 50 parts of urea for every 100 parts of total urea and limestone and about 3 to 8 parts of water for every 100 parts of total water and urea in the melt, distributing said fluid melt at about 115° C. as strands or rods in grooves formed on a cooling surface, said grooves having a width and a depth of the order of 0.1 inch and side walls flaring at an angle of about 99½° with the bottom of the grooves, cooling the melt in the grooves to a temperature of about 50° C., and breaking out of the grooves and into granules the strands or rods of melt which has been partially solidified by cooling it to said temperature.

CHARLES K. LAWRENCE.
AYLMER H. MAUDE.